United States Patent [19]

Scheffels et al.

[11] 4,160,149
[45] Jul. 3, 1979

[54] METHOD FOR WELDING WORKPIECE PARTS BY MEANS OF AN ENERGY BEAM

[75] Inventors: Wilhelm Scheffels, Puchheim; Johannes Koy, Germering, both of Fed. Rep. of Germany

[73] Assignee: Steigerwald Strahltechnik GmbH, Munich, Fed. Rep. of Germany

[21] Appl. No.: 820,325

[22] Filed: Jul. 29, 1977

[30] Foreign Application Priority Data

Aug. 3, 1976 [DE] Fed. Rep. of Germany ....... 2634833

[51] Int. Cl.² .............................................. B23K 9/00
[52] U.S. Cl. ............................................ 219/121 EM
[58] Field of Search ................ 219/121 EB, 121 EM, 219/121 L, 121 LM

[56] References Cited

U.S. PATENT DOCUMENTS

| 3,417,223 | 12/1968 | Steigerwald | 219/121 EM |
| 3,448,240 | 6/1969 | Steigerwald | 219/121 EM |

FOREIGN PATENT DOCUMENTS

| 2204184 | 8/1972 | Fed. Rep. of Germany. |
| 2423577 | 5/1973 | Fed. Rep. of Germany. |
| 2093322 | 1/1972 | France. |

*Primary Examiner*—J. V. Truhe
*Assistant Examiner*—Fred E. Bell
*Attorney, Agent, or Firm*—Brumbaugh, Graves, Donohue & Raymond

[57] ABSTRACT

In an energy beam welding method, as an electron beam welding method, wherein an elongated body or wire of filler material is introduced in a welding zone produced by the beam and comprising fused material, the filler material body is used to act on the fused material to prevent it from flowing out of the welding zone, which would cause voids and other defects of the seam produced. The method is particularly useful in welding thick workpieces as sheet metal plates with thicknesses of one to two inches and more.

7 Claims, 3 Drawing Figures

METHOD FOR WELDING WORKPIECE PARTS BY MEANS OF AN ENERGY BEAM

The present invention relates to a method for welding workpiece parts, whose thickness amounts to more to 5 mm and more particularly more than 20 mm, by means of an energy beam, more particularly an electron beam, in the case of which the energy beam is moved with the production of a welding channel, which comprises fused workpiece material, along a joint gap to be closed by welding in relation to the workpiece parts forming the joint gap and filler material, for example, in the form of an elongated body such as a wire, rod or strip or in the form of a powder or granulate, is introduced into the welding zone for filling the joint gap.

Electron beam welding has already been proposed in which filler material is added. The filler material is added "ahead" of the beam, that is to say on the side, not as yet welded, of the butt or joint gap above the workpiece parts to be welded, since at this position satisfactory melting down on the filler material, which conventionally has the form of a wire, rod or strip, by the approaching electron beam is ensured, In the case of welding of relatively thick workpiece parts, such as steel plate with a thickness above 20 mm and more particularly above 40 or 50 mm problems however occur. Workpieces with such thicknesses generally have corresponding large dimensions in other directions and is then usually necessary to allow relatively large tolerances with respect to the shape and/or dimensions, as otherwise processing costs will assume a prohibitive level. The larger tolerances lead on the one hand to the disadvantage of the breadth of the joint gap to be closed by welding is uneven and can assume relatively large values and on the other hand there is the disadvantage that the workpiece parts to be welded must be "tacked" together, that is to say provisionally joined together at the joint gap at spaced positions.

In the case of welding with large joint gaps by means of an energy beam there is the danger of the energy beam in the welding zone causing workpiece material to be heated up to relatively high temperatures, so that it is of a relatively low viscosity and accordingly flows out of the welding zone and as a result faulty weld seams with flows can be produced. The molten workpiece material in the welding zone, for which below the terms "welding or melt bath" are also used, is thus not only acted upon by gravity but also by substantial dynamic forces, since vigorous flow movements occur in the melt. In the case of conventional welding with a flame or an electric arc these problems only occur to a substantially smaller extent or do not occur at all, since the heat is supplied more slowly and in a substantially less concentrated fashion than is the case with an energy beam and the melt therefore not so hot and freely flowing as is the case with energy beam welding. The tacks provisionally connecting the workpiece parts together on the other hand hinder the introduction or supply of the filler material.

The present invention has the aim of avoiding the above mentioned disadvantages and of providing a method for welding relatively thick and large workpiece parts by means of an energy beam, preferably of an electron beam, which ensures satisfactory weld seams even in the case of thick workpieces with large and substantially varying breadths of the joint gap notwithstanding the existence of tacks which bridge over the joint gap.

This aim is achieved in the case of a method of the initially mentioned type in accordance with the invention that the inclination of the melt bath to flow out of the joint gap or the welding zone respectively is avoided or at least substantially reduced by the transmission of forces from the filler material to the melt bath and/or by transmission of heat from the melt bath to the filler material (and accordingly with a reduction of the temperature in the melt bath). In the case of known energy beam welding methods the filler material is on the other hand introduced into the energy beam above the welding zone and is fused by a part of the beam cross-section substantially without the melt bath so that practically the whole of the filler material is already liquified when it joins the melt bath. The filler material is preferably introduced with such an orientation and speed into the melt bath that at least part of the filler material is fused in the melt bath without reaching the beam zone of the energy beam. In the case of the use of compact filler material (wire, rod, strip etc.) at least 40, more particularly more than 50 as for example 70% or more of the filler material should be fused when the still solid residue of the material reaches the zone on which the energy beam impinges. The zone, in which the compact filler material enters the melt can be located partly or completely without the beam impingement zone of the melt and in this respect preferably the beam should only slightly (for example for less than 50%) fuse the filler material outside the melt or not fuse it at all.

Preferably the filler material is introduced short of the energy beam when considered in the direction of movement of the energy beam axis with respect to the joint gap between the workpiece parts.

The filler material can be supplied on the side, which is impinged upon by the energy beam, of the workpiece parts or on the side which is remote from it of the workpiece parts. It is also possible to sling granular or pulverulent filler material at a substantial velocity against the surface of the melt bath and as a result to exert on the surface a corresponding movement impulse directed into the interior of the melt bath and simultaneously the surface of the melt bath is cooled by the heat required for fusion.

Owing to the fact that in the method of the invention filler material which is still in a solid state of aggregation is introduced into the melt bath is used several advantageous effects are produced: the melt is cooled by the filler material introduced and it can therefore not flow so readily out of the weld channel. The danger of the melt flowing out of the welding zone is reduced further by surface tension which tends to cause the melt to cling to the part of the filler material body which is still solid.

More particularly owing to the transmission of the kinetic energy of the filler material to the weld bath the flow behavior of the melt can be influenced for example when the filler material in the form of powder or granules is intentionally thrown against the surface of the welding bath, it is possible to prevent as a result any flowing of the melt out of the welding zone. It is furthermore clear that tacks can no longer cause trouble since at the positions where the additional material or filler material is introduced into the weld zone they will have already been fused by the energy beam.

In accordance with a further development of the invention an elongated filler material body is moved in the longitudinal or transverse direction of the joint gap (seam) as the body is introduced into the melt. The movement can be such that the axis of the filler material on being moved remains parallel to itself or the axis of the filler material body can be swung during the movement. Owing to this intentional effect on the direction of flow and the form of movement of the melt bath the evenness of the weld seam can be enhanced and for example the formation of flaws can be avoided.

In the case of very thick workpiece parts and a relatively broad joint gap preferably filler material is introduced into the melt on both sides of the seam.

The filler material must naturally be capable of being fused into or welded to the customary workpiece material of metal to be welded so that the resulting weld seam can comply with the requirements it has to meet. The additional material can in this respect be the same as the workpiece material or it can have a somewhat different composition, for example in order to improve the strength of the weld seam. A flux can be added to the filler material body.

The method in accordance with the invention is now to be explained in detail with reference to embodiments and to the accompanying drawings.

Figure 1:
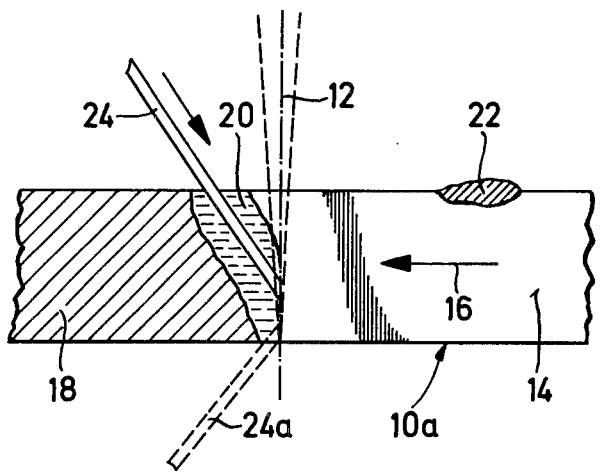
FIG. 1 shows a sectional view in the center plane of a butt joint between two workpiece parts, which are welded by a method in accordance with one embodiment of the invention.
Figure 2:
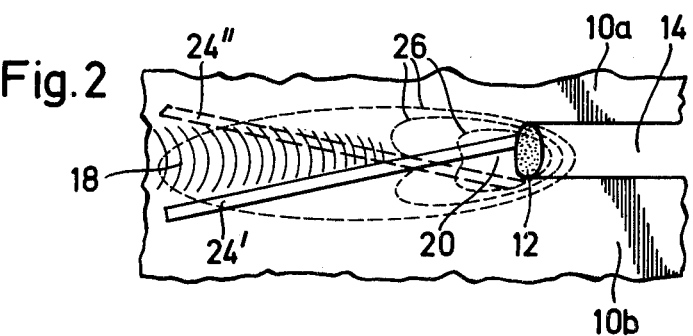
FIG. 2 is an enlarged plane view of two workpiece parts during welding.

In FIGS. 1 and 2 two workpiece parts 10a and 10b are represented during welding by means of a high-energy electron beam 12 which produced in a conventional manner and during welding of the two workpiece parts can be periodically caused to move (caused to "oscillate" or "wag") with respect to the transversal direction of the separating gap 14. The workpiece parts 10a and 10b are moved with respect to the electron beam 12 in the direction of an arrow 16. On the left hand side in FIGS. 1 and 2 the separating gap 14 has already been filled by fused and then resolidified material 18, which forms the desired weld seam. The energy beam 12 produces a weld channel, which comprises a zone 20 (weld bath) filled with fused workpiece material and filler material.

FIG. 1 furthermore shows a tack 22, by means of which the workpiece parts 10a and 10b are provisionally joined together before the welding operation proper.

In the zone 20 (melt bath) comprising the fused material additional material 24 is introduced which can for example be in the form of a wire, rod or strip, the introduction being "short of" the electron beam in the preferred embodiment represented. The wire filler material, for example with an angle of 45° with respect to the beam axis, dips a few millimeters into the melt behind the beam in such a manner that the zone, which is already solidifying, of the seam is no longer impinged upon. The wire tip can for example reach the beam 12 at approximately two thirds of the depth of the seam. The additional material 24 already fuses to a substantial extent, for example for more than 50%, in the melt in the melt bath 20 and it is only remaining part which is liquified by the direct action of the electron beam 12.

The deep introduction of the additional material as described into the melt tends to counteract the tendency, to be observed on welding with a vertically running energy beam and the supply of filler, for the basic material, derived by melting of the workpiece parts, to be preferentially deposited in the lower part of the seam and of the additional material without the thorough mixing, often desired for metallurgical reasons, of the two materials being ensured. Owing to the introduction of the additional material furthermore the melt is cooled down, as is represented for example by the isotherms 26 in FIG. 2; this substantially reduces the inclination of the filler material to flow out of the zone of the seam.

An intentional effect on movement of the melt bath can be brought by particular cross-sectional of the additional material (for example strip) and/or a mechanical movement of the filler material. The movement can be transverse with respect to the seam plane and/or perpendicularly to it and/or, furthermore, in accordance with a circular vibratory movement of the dipping elongated filler material body, as is indicated in FIG. 2 by the positions, shown respectively in full and interrupted lines of the filler material rod 24' and respectively 24". Owing to the deep penetration of the filler material into the fusion or melt bath of the seam and the final fusion of the filler material deep in the interior of the melt bath the method of the present invention differs as a matter of principle from the movements of the welding wire as practised in autogeneous welding. Naturally in the case of the present invention it is possible to use the filler material to achieve the desired geometry of the solidifying top or bottom bead of the weld seam.

Figure 3:
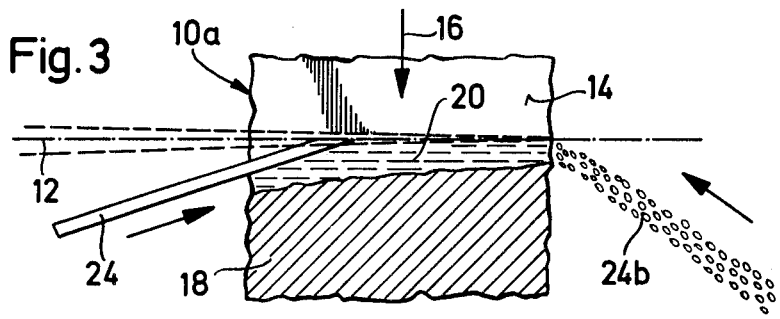
FIG. 3 is a sectional view in the center plane of a joint gap between two workpiece parts which are welded in accordance with a further embodiment of the method of the invention.

FIG. 3 shows on the same lines as FIG. 1 conditions in the case of welding with a horizontal beam. In this case as well the material and temperature distribution can be influenced in the above explained manner by means of the filler material.

In order to prevent the melt flowing out of the seam zone in accordance with a further development of the invention on the side, remote from the beam, of the seam as well filler material is introduced into the melt. This is represented in FIG. 1 by filler material wire 24a. The filler material wire introduced into the melt on the side remote from the beam is wetted by the melt and owing to this wetting action and the surface tension and also owing to the blocking of a part of the cross-section of the surface of the melt the wire tense to dam up the melt. It this case as well special cross-sectional shapes of the filler material may be chosen in order to achieve the useful effect of increasing the forces which act between the melt and the solid filler material. The damming action on the melt is also achieved if the filler material is slung in the form of powder or granules against the surface of the melt, as is represented in FIG. 3 by a granule jet 24b.

We claim:

1. A method for welding relatively thick workpiece parts, by means of an energy beam, more particularly an electron beam, in the case of which the energy beam is moved with the production of a welding channel, which comprises fused workpiece material, along a joint gap to be closed by welding in relation to the workpiece parts forming the joint gap and filler material is introduced into the welding zone for filling the joint gap, characterized in that the position, speed and force with which the filler material is introduced into the fused workpiece material are selected to exert physical and thermal forces on the fused material which reduce the tendency of the fused material to flow out of said joint gap.

2. A method in accordance with claim 1, characterized in that the filler material is introduced, in terms of the movement of the energy beam axis with respect to the joint gap between the workpieces, short of the energy beam into the weld bath.

3. A method in accordance with claim 1 characterized in that the filler material strip is introduced with an angle between approximately 15° and 45° with respect to the beam axis.

4. A method in accordance with claim 1 characterized in that the filler material is introduced into the fused workpiece material, from both sides of the workpiece with respect to the beam.

5. A method in accordance with claim 1 characterized in that the filler material strip on being introduced into the fused material is moved in the longitudinal and/or transverse direction of the joint gap.

6. The method according to claim 1 wherein said filler material is in the form of an elongated strip and said position and speed are selected to cause transfer of heat from said fused material to said filler material strip in sufficient amounts to at least partially melt said filler material at a position prior to the intersection of said filler material strip and said energy beam.

7. The method according to claim 1 wherein said filler material comprises a powder or granular material and wherein said filler material is propelled against a surface of said fused material thereby to oppose the tendency of said fused material to flow out of said joint gap.

* * * * *

UNITED STATES PATENT AND TRADEMARK OFFICE
CERTIFICATE OF CORRECTION

PATENT NO. : 4,160,149

DATED : July 3, 1979

INVENTOR(S) : Scheffels et al.

It is certified that error appears in the above-identified patent and that said Letters Patent are hereby corrected as shown below:

```
Column 1, line 24, after "ensured" the comma should be a period;
Column 3, line 67, after "only" insert --the--;
Column 4, line 48, "tense" should read --tends--;
Column 4, line 49, "It" should read --In--;
Column 5, line 10, "claim 1" should read --claim 6--;
Column 6, line 1, "claim 1" should read --claim 6--.
```

Signed and Sealed this

Fourth Day of March 1980

[SEAL]

Attest:

SIDNEY A. DIAMOND

Attesting Officer

Commissioner of Patents and Trademarks